Aug. 3, 1965   W. C. MOORE   3,198,064
BLOOD SAMPLE HOLDER
Filed June 29, 1961

INVENTOR.
WILLIAM C. MOORE

United States Patent Office 3,198,064
Patented Aug. 3, 1965

3,198,064
BLOOD SAMPLE HOLDER
William C. Moore, Skaneateles, N.Y., assignor to Welch Allyn, Inc., Skaneateles Falls, N.Y., a corporation of New York
Filed June 29, 1961, Ser. No. 132,252
3 Claims. (Cl. 88—14)

This invention relates to an improvement in blood sample holders and more particularly to a disposable holder for use in a hemoglobinometer for determining the hemoglobin content of blood.

Medical diagnosis often requires that the hemoglobin concentration of the blood be measured, and frequently this measurement must be made quickly without the delays occasioned by the usual laboratory routine. Hemoglobinometers for such measurements require that a sample of the patient's blood, either in the whole state or hemolysed, be held in a layer of predetermined thickness for a color or density measurement. This measurement may be made either by visual matching with a comparison member such as a calibrated optical wedge, or by subjecting the sample to a light of predetermined intensity and measuring the light transmitted through the sample by means of a photoelectric cell and ammeter. Since the sample must have a known uniform thickness it is advantageous to provide a pipette-type of blood sample holder into which the blood may be drawn by capillary attraction, and since the measurement must be frequently made quickly it is advantageous that the sample holder be instantly available without adjustment or preparation.

The principal object of the present invention, accordingly is to provide a blood sample holder for use with a hemoglobinometer which is ready for instant use without further preparation, which may be easily filled with the blood to be tested without an applicator, and which is easily and inexpensively made so as to be disposable.

Further objects are to provide a blood sample holder which may be easily and economically made in quantity, without movable parts, which may be easily and cheaply packaged in quantity for cleanliness, but which will provide holding means for a blood sample of accurately determined known thickness.

Figure 1:
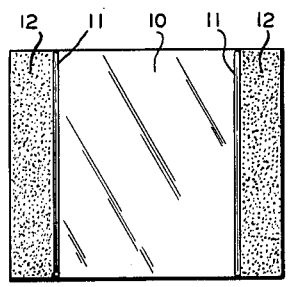
Figure 2:
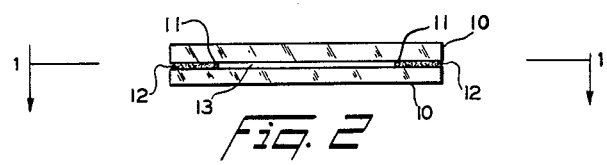
Figure 3:
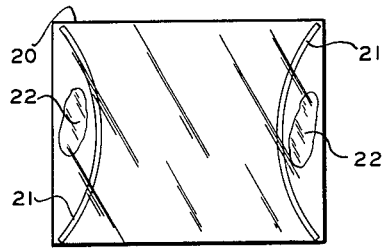
Figure 4:

Other objects and advantages will become apparent from the following description taken in conjunction with the accompanying drawing, in which:

FIGURE 1 is a sectional view of a preferred form of blood sample holder according to the present invention on the line 1—1 of FIG. 2;
FIGURE 2 is a side elevational view thereof;
FIGURE 3 is a plan view of another form of blood sample holder; and
FIGURE 4 is a side elevational view thereof.

In the embodiment shown in FIGURES 1 and 2, two sheets or plates of glass 10 are spaced apart by the members 11 of fine wire or the like and are secured together at opposite sides, in spaced apart relation, by a layer of adhesive 12, preferably of the epoxy type which forms a good bond with the glass and is unaffected by moisture. The wire spacer members 11 are normally of a diameter of the order of a few thousandths of an inch, being made of wire which can be drawn to the desired size with little variation. The spacers 11 lie parallel across and between plates 10 and include therebetween a space 13 bounded by the major portion of the adjacent surfaces of plates 10.

In operation, the side edge of the blood sample holder may be brought in contact with a drop of blood to be tested and the narrow space 13 acts as a pipette, drawing the blood into the space by capillary attraction. Preferably, the blood sample holder is supplied with the inner spaced surfaces of the plates 10 coated with a wetting agent in order to facilitate this pipette action. If the measurement to be made in the hemoglobinometer requires that the blood sample be hemolysed, the coating of plates 10 may include a hemolytic agent such as saponin, either mixed with the wetting agent or without a wetting agent.

Since the plates 10 are spaced apart by the accurately drawn wires 11, the thickness of the space 13 is always the same for the blood sample taken in any sample holder, thus ensuring accuracy in the measurement obtained by the hemoglobinometer.

Obviously, the plates 10 may be made of any hard transparent material, but glass is cheap and therefore preferred. The adhesive layers 12 may be of any material having good bonding characteristics with the material of the plates 10 whether the bond is obtained by heat or otherwise. When glass is used for the plates 10, the adhesive may be glue, plastic, solder glass, glass, soft solder, or even any metal which may be bonded to glass by heating and which will remain sealed to the glass on cooling.

In FIGURES 3 and 4, another embodiment of the present invention is shown in which the glass plates 20 are separated by the curved wire spacers 21 at opposite sides. The sides of the plates 20 are bonded together outwardly of the spacers 21 by a glass bead 22 which has been melted and fused to the plates 20 by heat in a well known manner. The space 23 between the center portions of the plates 20 is thus accurately fixed as to thickness and this form of blood sample holder is used exactly as the form described in connection with FIGURES 1 and 2.

It will now be apparent that a blood sample holder has been provided which may be very cheaply made so as to be disposable, but which has a very high degree of accuracy as to the thickness of the blood sample taken for measurement.

As will be apparent to those familiar with the art, the invention may be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

1. A disposable blood sample holder for use in a hemoglobinometer or the like, comprising: a pair of sheets of rigid transparent material having borders of substantially the same configuration, spacing means between said sheets located between the centers of said sheets and said borders on at least two diametrically opposite sides of said sheets, and material having good bonding characteristics with the material of the sheets sandwiched between said pair of sheets at said opposite sides between said spacing means and said borders, said spacing means being round in cross section and of uniform diameter, said bonding material securing said sheets together at said opposite sides in intimate contact with said spacing means, and a substantial portion of said sheets between said opposite sides being spaced apart the thickness of said spacer members.

2. A disposable blood sample holder for use in a hemoglobinometer or the like, comprising: a pair of sheets of glass having borders of substantially the same configuration; a plurality of round wire spacer members having uniform diameters disposed between said sheets between the centers thereof and said borders on at least two opposite sides, and bonding material having good adhering characteristics with glass disposed between said sheets outwardly of said members, said material being bonded to said glass sheets and securing them in intimate contact with said members along their entire length said spacer members including therebetween a major portion of the inner surfaces of said glass sheets.

3. A disposable blood sample holder comprising a pair of flat transparent plates of substantially uniform configuration, a pair of fine wire spacer members having uniform diameters disposed across and between said plates on either side of the center thereof and intermediate the ends thereof, an adhesive material being disposed between said plates adjacent said ends said material being bonded to said plates and securing them in intimate contact with said members, the major part of the inner surfaces of said plates being between said spacer members and thereby narrowly spaced apart for introduction of blood therebetween by capillary attraction.

References Cited by the Examiner

UNITED STATES PATENTS

| | | | |
|---|---|---|---|
| 2,621,557 | 12/52 | Kavanagh | 88—40 X |
| 2,673,789 | 3/54 | Brown | 88—14 X |
| 2,827,825 | 3/58 | White | 88—14 |
| 2,863,319 | 12/58 | McLin | 73—425.4 |
| 3,009,352 | 11/61 | Neuda | 88—14 X |

OTHER REFERENCES

Kivenson et al.: "Some New Techniques in the Construction of Spectrographic Absorption Cells," Journal of the Optical Society of America, vol. 39, No. 6, June 1949, pages 484 and 485.

JEWELL H. PEDERSEN, *Primary Examiner.*

EMIL G. ANDERSON, *Examiner.*